United States Patent
Miki et al.

(10) Patent No.: US 7,593,137 B2
(45) Date of Patent: Sep. 22, 2009

(54) IMAGE PROCESSING METHOD, IMAGE PRINTING METHOD, IMAGE PRINTING MECHANISM AND PRINTED MATTER

(75) Inventors: Takeo Miki, Machida (JP); Takashi Yamaguchi, Kawasaki (JP)

(73) Assignee: Kabushiki Kaisha Toshiba, Tokyo (JP)

(*) Notice: Subject to any disclaimer, the term of this patent is extended or adjusted under 35 U.S.C. 154(b) by 614 days.

(21) Appl. No.: 11/191,275

(22) Filed: Jul. 28, 2005

(65) Prior Publication Data

US 2006/0023260 A1  Feb. 2, 2006

(30) Foreign Application Priority Data

Jul. 28, 2004  (JP)  ............... 2004-220689

(51) Int. Cl.
 *H04N 1/40* (2006.01)
 *G06F 15/00* (2006.01)
 *G06K 15/00* (2006.01)
 *G06K 9/00* (2006.01)
 *B42D 15/00* (2006.01)

(52) U.S. Cl. .............. 358/3.28; 358/1.9; 358/1.16; 382/100; 283/113

(58) Field of Classification Search ............. 358/3.28
See application file for complete search history.

(56) References Cited

U.S. PATENT DOCUMENTS

| | | | | |
|---|---|---|---|---|
| 5,905,819 | A * | 5/1999 | Daly | 382/284 |
| 6,590,996 | B1 * | 7/2003 | Reed et al. | 382/100 |
| 2002/0021824 | A1 * | 2/2002 | Reed et al. | 382/100 |
| 2002/0180998 | A1 * | 12/2002 | Wu | 358/1.9 |
| 2003/0076979 | A1 * | 4/2003 | Matsui | 382/100 |
| 2003/0079130 | A1 | 4/2003 | Reed | |
| 2003/0137695 | A1 * | 7/2003 | Nomizu | 358/1.16 |
| 2004/0121131 | A1 | 6/2004 | Yamaguchi et al. | |
| 2005/0157149 | A1 | 7/2005 | Yamaguchi et al. | |

FOREIGN PATENT DOCUMENTS

EP  1 533 750 A2  5/2005

(Continued)

OTHER PUBLICATIONS

Japanese Office Action dated Nov. 25, 2008 for Appln. No. 2004-220689.

(Continued)

*Primary Examiner*—Twyler L Haskins
*Assistant Examiner*—Barbara D Reinier
(74) *Attorney, Agent, or Firm*—Pillsbury Winthrop Shaw Pittman, LLP (57) ABSTRACT

A multi-gradation image such as a face image of a person in which sub-information is to be embedded is subjected to a preprocess by a preprocessing section based on a relationship between certain image data and read image data of a printed matter on which the certain image data is printed, sub-information is embedded into the multi-gradation image subjected to the preprocess by the preprocessing section by use of an digital watermark embedding section in an invisible state to the human eye, and the multi-gradation image having the sub-information embedded therein by the digital watermark embedding section is subjected to a post-process corresponding to the preprocess performed by the preprocessing section by use of a post-processing section.

6 Claims, 5 Drawing Sheets

FOREIGN PATENT DOCUMENTS

| | | |
|---|---|---|
| GB | 2 360 659 | 9/2001 |
| JP | 08-088757 | 4/1996 |
| JP | 08-298588 | 11/1996 |
| JP | 09-248935 | 9/1997 |
| JP | 2001-268346 | 9/2001 |
| WO | WO 01/50409 A1 | 7/2001 |

OTHER PUBLICATIONS

European Search Report dated Oct. 5, 2006 for Appln. No. 05016438.3-2202.

Japanese Office Action dated Feb. 24, 2009 for Application No. 2004-220689.

\* cited by examiner

| 0 | 32 | 64 | 96 |
| 128 | 160 | 192 | 224 |

IMAGE PROCESSING METHOD, IMAGE PRINTING METHOD, IMAGE PRINTING MECHANISM AND PRINTED MATTER

CROSS-REFERENCE TO RELATED APPLICATIONS

This application is based upon and claims the benefit of priority from prior Japanese Patent Application No. 2004-220689, filed Jul. 28, 2004, the entire contents of which are incorporated herein by reference.

BACKGROUND OF THE INVENTION

1. Field of the Invention

This invention relates to an image processing method for processing a multi-gradation image input by an image input means such as a camera, an image printing method for printing a multi-gradation image processed by the image processing method on a recording medium, an image printing mechanism using the image printing method and a printed matter printed by the image printing mechanism, for example.

2. Description of the Related Art

Recently, as information has become more electronic and the Internet more popular, more importance is being attached to the technique of using an digital watermark, digital signature and the like in order to prevent forgery and alteration of images. Particularly, the digital watermark technique is proposed as measures against illegal copying, forgery and falsification of a personal authentication medium such as an ID card and a photograph having copyright information embedded therein. The digital watermark technique is a technique for embedding additional sub-information (sub-image information) in a main image (main image information) in an invisible state.

For example, a method for embedding preset information into image information output to a printed matter by use of characteristics of color-difference components and high-spatial-frequency components which are difficult to be perceived by a human being is described in Jpn. Pat. Appln. KOKAI Publication No. H9-248935.

Further, the digital watermark technique which can make it possible to confirm sub-information by use of an optical filter is described in Jpn. Pat. Appln. KOKAI Publication No. 2001-268346.

In the conventional digital watermark technique, a method for embedding sub-information into a main image by mainly using the following characteristics 1 to 3, below, is proposed.

(1) The visual characteristic of a human being is used:

For example, as the visual characteristic of a human being, the factor that the gradation identification ability of the human being becomes lower as the frequency of the image becomes higher and the factor that color-difference information is more difficult to be determined by the human being in comparison with luminance information are provided.

(2) The relation between complementary colors is used:

For example, the factor that "red+cyan" makes an achromatic color is used. In the case of additive color mixture, red and cyan (=green+blue) are set in the complementary color relation. Therefore, if a red pixel and a cyan pixel are adjacent to each other, the combined pixels look like an achromatic color pixel to human eye.

(3) The complementary color relation and color-difference information are used for a high-frequency carrier pattern image:

For example, when red-rich pixels and cyan-rich pixels are repeatedly arranged by use of a high-frequency carrier pattern image, it is impossible for the human eye to identify a difference between the fine color differences. As a result, a human being recognizes that the color difference amount is "±0".

Further, the sub-information embedded by use of the digital watermark technique is restored by a restoring process by use of key information. For example, when sub-information is restored from an image (a synthesized image having sub-information embedded therein) printed on a printed matter, first, the image printed on the printed matter is read as read image data by use of an image input device such as a scanner or digital camera. Then, the read image data is subjected to a filtering process by a digital filter having a frequency component corresponding to information of the particular frequency of key information. As a result, sub-information embedded as color-difference information is restored.

However, in the above conventional watermark technique, the restorability of sub-information may vary depending on the color of the main image. For example, when the main image is a face image, the image quality of a black portion (region of high concentration) such as a black hair portion may be deteriorated in the printing process by use of the printing mechanism such as a printer or in the image reading process by the image reading device such as a scanner. That is, in the region of high concentration, if sub-information is embedded with the same color-difference amount as that of a portion (region of intermediate concentration) of skin color, the restorability of the sub-information may be degraded in comparison with the region of intermediate concentration in some cases.

BRIEF SUMMARY OF THE INVENTION

An object of this invention is to provide an image processing method, image printing method, image printing mechanism and printed matter in which sub-information having high restorability can be embedded in any type of multi-gradation image.

An image processing method according to one aspect of the present invention which is a multi-gradation image processing method comprises inputting a multi-gradation image, subjecting the input multi-gradation image to a preprocess based on a relation between certain image data and read image data of a printed matter on which the certain image data is printed, embedding sub-information in the multi-gradation image subjected to the preprocess in an invisible state, and subjecting the multi-gradation image having the sub-information embedded therein to a post-process corresponding to the preprocess.

An image printing method according to one aspect of the present invention which is a method for printing a multi-gradation image on a recording medium comprises inputting a multi-gradation image, subjecting the input multi-gradation image to a printing image process, subjecting the multi-gradation image subjected to the printing image process to a preprocess based on a relation between certain image data and read image data of a printed matter on which the certain image data is printed, embedding sub-information in the multi-gradation image subjected to the preprocess in an invisible state, subjecting the multi-gradation image having the sub-information embedded therein to a post-process corresponding to the preprocess, and printing the multi-gradation image subjected to the post-process on a recording medium.

An image printing mechanism according to one aspect of the present invention comprises an image input section which inputs a multi-gradation image on a printed matter, a printing image processing section which subjects the multi-gradation image input by the image input section to a printing image process, a preprocessing section which subjects the multi-gradation image subjected to the printing image process by the printing image processing section to a preprocess based on a relation between certain image data and read image data of a printed matter on which the certain image data is printed, a sub-information embedding section which embeds sub-information in the multi-gradation image subjected to the preprocess by the preprocessing section in an invisible state, a post-processing section which subjects the multi-gradation image having the sub-information embedded therein by the sub-information embedding section to a post-process corresponding to the preprocess by the preprocessing section, and a printing section which prints the multi-gradation image subjected to the post-process by the post-processing section on a recording medium.

An image printed matter according to one aspect of the present invention comprises a printing surface on which a multi-gradation image in which sub-information having higher restorability in an image region of higher concentration is embedded is printed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

There will now be described embodiments of this invention with reference to the accompanying drawings.

Figure 1:
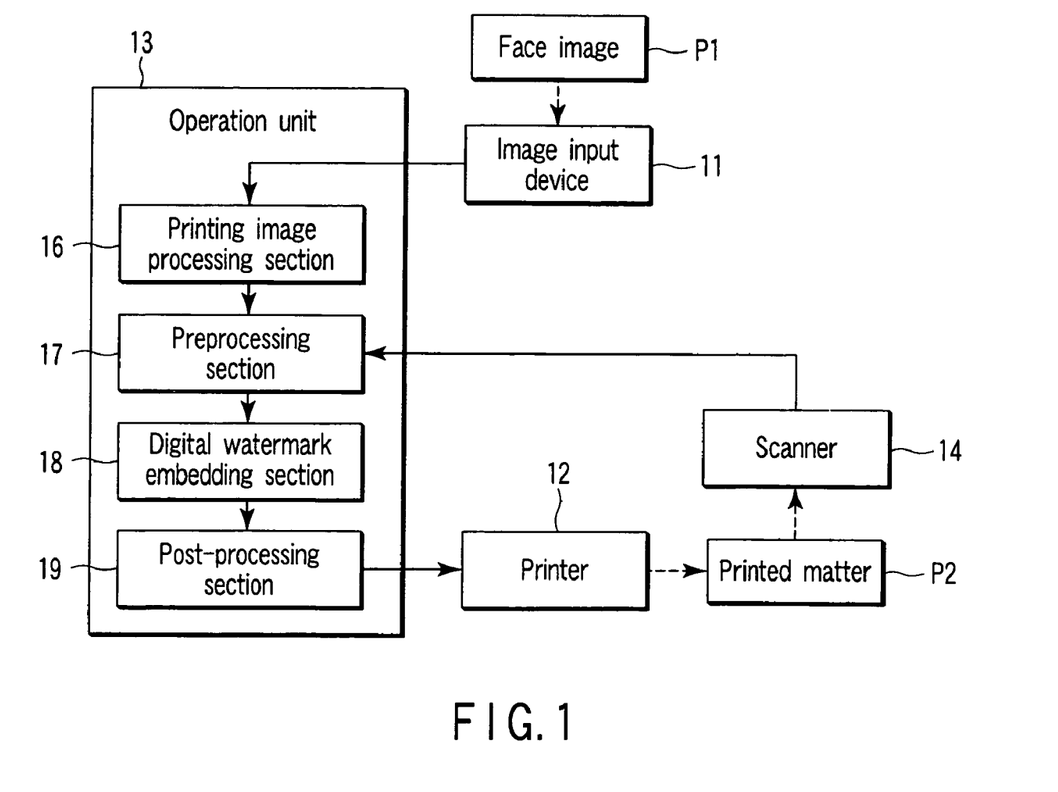
FIG. 1 is a block diagram schematically showing the configuration of an image printing mechanism to which an image processing method and image printing method according to embodiments of this invention are applied.

FIG. 1 is a diagram schematically showing an example of the configuration of an image printing mechanism according to one embodiment of this invention. In the image printing mechanism shown in FIG. 1, an image processing method and image printing method according to embodiments of this invention are applied.

As shown in FIG. 1, the image printing mechanism includes an image input device 11, printer 12, operation unit 13 and scanner 14. The image input device 11 and operation unit 13, the printer 12 and operation unit 13, and the scanner 14 and operation unit 13 are configured to perform bidirectional data communication. That is, the image input device 11, printer 12, operation unit 13 and scanner 14 each have an interface, such as USB and SCSI, which can bidirectionally communicate a signal.

The image input device 11 inputs a multi-gradation image as digital image information. Further, the image input device 11 is configured by a digital camera, video camera or flat bed scanner, for example. In this embodiment, a case wherein the image input device 11 is configured by a digital camera is mainly explained. Generally, in the image input device such as a digital camera or scanner, image data is input as multi-gradation digital image data of red (R), green (G) and blue (B). In this embodiment, the explanation is made based on the assumption that the image input device 11 inputs a face image of a person or the like as multi-gradation RGB digital image data.

The printer 12 subjects the surface of a recording medium to the printing process. That is, the printer 12 forms a printed matter P2 such as an ID card. The printer 12 prints a binary image such as a multi-gradation image or characters on a recording medium. A printer which prints a multi-gradation image generally performs a printing process for a recording medium based on multi-gradation digital image data of cyan (C), magenta (M) and yellow (Y). In this embodiment, the explanation is made on the assumption that the printer 12 performs the printing process for a recording medium based on multi-gradation CMY digital image data.

The operation unit 13 is a device which performs various image processes. The operation unit 13 is a personal computer (which is hereinafter simply referred to as a PC) which includes a CPU, semiconductor memory, hard disk device, image capture board and communication interface, for example. Further, the operation unit 13 may be configured to include a processing board which has a CPU, semiconductor memory, hard disk device and image capture board. In this embodiment, a case wherein the operation unit 13 is configured by the PC is explained.

The scanner 14 reads an image on a recording medium as multi-gradation digital image data. For example, the scanner 14 reads an image on the printed matter P2 printed by the printer 12 as multi-gradation RGB digital image data. As described above, in the scanner, image data is generally input as multi-gradation RGB digital image data. In this embodiment, the explanation is made based on the assumption that the printer 14 reads a face image of a person printed on a recording medium as multi-gradation RGB digital image data. Further, an image input device such as a digital camera can be used as the scanner 14. Also, the image input device 11 maybe used as the scanner 14.

Further, as shown in FIG. 1, the operation unit 13 includes a printing image processing section 16, preprocessing section 17, digital watermark embedding section 18 and post-processing section 19. In this embodiment, the printing image processing section 16, preprocessing section 17, digital watermark embedding section 18 and post-processing section 19 are functions attained by part of an application program executed by the operation unit 13.

The printing image processing section 16 forms an image for printing. The printing image processing section 16 subjects multi-gradation image information input by the image input device 11 to a printing image process. As the printing image process, a color conversion process is performed, for example.

The preprocessing section 17 subjects multi-gradation image information to an image process as the preprocess. In the preprocessing section 17, a process corresponding to the relation between certain image data and read image data obtained by reading a printed matter of the certain image data printed by the printer 12 by use of the scanner 14 is performed as the preprocess. In the example of the configuration shown in FIG. 1, the preprocessing section 17 performs the preprocess for multi-gradation image information which is subjected to the printing image process by the printing image processing section 16. The preprocess (gradation correction process) performed by the preprocessing section 17 will be explained in detail later.

The digital watermark embedding section 18 performs a process for embedding sub-information as an digital watermark into a main image. In other words, the digital watermark embedding section 18 forms a synthesized image having sub-information as an digital watermark embedded in a main image. In the example of the configuration shown in FIG. 1, the digital watermark embedding section 18 performs a process for embedding sub-information into multi-gradation image information as the main image preprocessed by the preprocessing section 17 in a state (invisible state) in which the sub-information is invisible to the human eye.

The post-processing section 19 subjects the multi-gradation image information to an image process as the post-process. In the post-processing section 19, a process corresponding to the processing contents of the preprocess by the preprocessing section 17 is performed as the post-process. Specifically, in the post-processing section 19, a process (inverse conversion process) which has an approximately inverted relation with respect to the preprocess by the preprocessing section 17 is performed as the post-process. In the example of the configuration shown in FIG. 1, the post-processing section 19 subjects synthesized image information formed by the digital watermark embedding section 18 to the post-process. The post-process performed by the post-processing section 19 will be explained in detail later.

Next, the operation of the image printing mechanism with the above configuration is explained.

Figure 2:
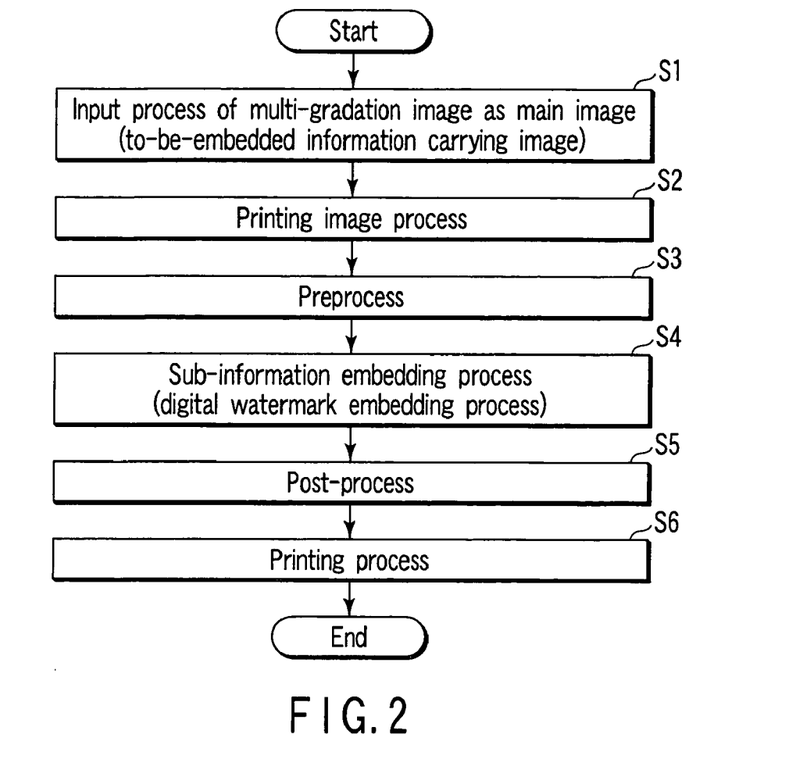
FIG. 2 is a flowchart for illustrating the flow of a process of the image processing mechanism.

FIG. 2 is a flowchart for illustrating the flow of a process of the image printing mechanism of the above configuration.

First, the image input device 11 inputs a multi-gradation image such as a face image of a person as a main image (to-be-embedded information carrying image) of a to-be-processed object which is subjected to an digital watermark process (step S1). That is, the image input device 11 inputs a multi-gradation image into which sub-information is to be embedded. In this example, a case wherein the multi-gradation image is a face image of a person photographed by a digital camera used as the image input device 11 is explained. Further, it is assumed that the image input device 11 photographs a face image of a person by using multi-gradation RGB digital image data as a multi-gradation image.

The multi-gradation image (multi-gradation RGB digital image data) photographed (input) by the image input device 11 is supplied to the operation unit 13. In the operation unit 13, the multi-gradation image photographed (input) by the image input device 11 is sequentially subjected to the printing image process, preprocess, digital watermark embedding process and post-process and output to the printer 12.

That is, in the operation unit 13, first, the multi-gradation image as the multi-gradation RGB digital image data photographed by the image input device 11 is subjected to the printing image process by the printing image processing section 16 (step S2). In the printing image processing section 16, for example, a color conversion process for converting RGB image data to CMY image data or the like is performed as the printing image process. That is, in the printing image processing section 16, a color conversion process for converting RGB image information used in the image input device such as a digital camera to image CMY information used in the printer or the like is performed as the printing image process.

If the multi-gradation image input by the image input device 11 is subjected to the printing image process by the printing image processing section 16, the preprocessing section 17 subjects the multi-gradation image subjected to the printing image process to a preprocess (step S3). The preprocess by the preprocessing section 17 is an image process such as a gradation correction process based on the relationship between certain printing image data and image data obtained by reading an image of a printed matter on which the certain printing image data is printed by use of the scanner 14. That is, the preprocessing section 17 performs an image process corresponding to the relationship between image data subjected to the printing image process by the printing image processing section 16 and image data obtained as the reading result of reading an image of a printed matter on which the above image data is printed by the printer 12 by use of the scanner 14. The relationship between image data subjected to the printing image process by the printing image processing section 16 and image data obtained as the reading result of reading an image of a printed matter on which the above image data is printed by the printer 12 by use of the scanner 14 will explained in detail later.

If the multi-gradation image subjected to the printing image process by the printing image processing section 16 is subjected to the preprocess by the preprocessing section 17, the digital watermark embedding section 18 performs a process (digital watermark embedding process) for embedding sub-information in the image subjected to the preprocess in a state in which the sub-information is invisible to the human eye (step S4).

If sub-information is embedded in the multi-gradation image subjected to the preprocess by the preprocessing section 17 by use of the digital watermark embedding section 18, the post-processing section 19 performs a post-process corresponding to the preprocess by the preprocessing section 17 (step S5). In the post-process by the post-processing section 19, a process (inverse conversion process) which is set in an approximately inverted relationship with respect to the preprocess by the preprocessing section 17 is performed. That is, in the post-processing section 19, a gradation correction process which is set in an inverted relationship with respect to the gradation correction process performed by the preprocessing section 17 is performed. Further, the post-processing section 19 outputs image data subjected to the post-process to the printer 12.

In the printer 12 which has received the image data subjected to the post-process by the post-processing section 19 of the operation unit 13, the image data (synthesized image having sub-information embedded in the main image) is printed on a recording medium (step S6). For example, when the image printing mechanism is applied to a system which forms an ID card having a face image printed thereon, the printer 12 performs a process for printing image data as the face image having sub-information embedded therein by the operation unit 13 in a preset region of the ID card set in an initial state as a recording medium. Thus, the printer 12 forms an ID card as a printed matter P2 on which the face image having sub-information embedded therein is printed.

Next, the processes performed by the respective sections in the operation unit 13 are explained.

As described above, in the operation unit 13, an image process is performed for an image input by the image input device 11 in the order of the printing image process, preprocess, digital watermark embedding process and post-process. That is, in the preprocessing section 17, a process is performed for image data (image data configured by the concentration of C [C value], the concentration of M [M value] and the concentration of Y [Y value]) obtained by converting image data of RGB (image data configured by the luminance of R [R value], the luminance of G [G value] and the luminance of B [B value]) input by the image input device 11 to CMY image data by use of the printing image processing section 16.

In this example, it is assumed that the values of C, M, Y in the CMY image data and the values of R, G, B in the RGB image data are each expressed by 8-bit data (24 bits in total) of "0 to 255". In this case, the value "0" among the values of C, M, Y shows the brightest concentration and the value "0" among the values of R, G, B shows the darkest state. In other words, the value "0" among the inverted values (values obtained by subtracting the respective values from "255") of the respective values of C, M, Y shows the darkest state and the value "255" among them shows the brightest state. That is, the values of the image data of CMY and the values of the image data of RGB are set in the relation in which the brightnesses thereof are set in the opposite state.

Further, in the present embodiment, the printing image process by the printing image processing section 16 is performed before the digital watermark embedding process. Therefore, in the digital watermark embedding section 18, the electronic watermark embedding process is performed for image data configured by R, G, B components (which are hereinafter referred to as Rc, Gm, By) in the inverted values of the respective values of C, M, Y.

In the technique of the digital watermark embedding process using a color difference, sub-information is embedded by adding or subtracting a color difference amount to or from multi-gradation image data as a main image in which sub-information is embedded. In this case, for example, the color difference amount can be added to image data having a value of "0", but the color difference amount cannot be subtracted therefrom. On the other hand, the color difference amount can be subtracted from image data having a value of "255", but the color difference amount cannot be added thereto. Therefore, a desired color difference amount cannot be attained depending one the value of the image data in some cases.

Further, in the technique of the digital watermark embedding process using a color difference, sub-information is restored by a digital band-pass filter process. For example, in the present embodiment, as the digital watermark embedding process, sub-information is embedded by superposing a color difference on a high-frequency carrier pattern image. Therefore, the sub-information embedded in the main image can be restored by use of a band-pass filter which passes only the carrier pattern frequency. As a result, as the color difference of the carrier pattern, that is, the amplitude of the carrier pattern is larger, the sub-information embedded in the main image can more easily pass through the band-pass filter and the restorability of the sub-information is enhanced. In other words, in order to enhance the restorability of the sub-information embedded in the main image, it is required to increase the color difference.

However, if the color difference is increased, the carrier pattern will be easily recognized by the human eye. If the carrier pattern is recognized by the human eye, the image quality of the synthesized image having the sub-information embedded therein is degraded. Particularly, if the color difference is increased in the intermediate concentration region such as the skin of a human being in the main image, the carrier pattern will be easily recognized by the human eye. On the other hand, even if the color difference is increased in a high concentration region such as the black hair portion in the main image, it is difficult to recognize the carrier pattern for the human eye.

By taking the above characteristic into consideration, in this embodiment, sub-information is embedded while the color difference amount is increased in the high concentration region such as the black hair portion and a normal color difference amount is maintained in the intermediate concentration region such as the skin of a human being.

Next, the preprocess by the preprocessing section 17 is explained.

Figure 3:
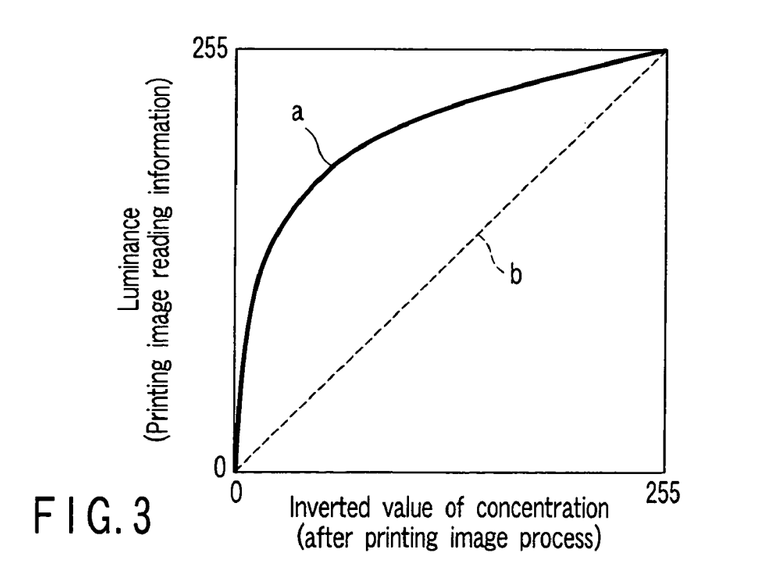
FIG. 3 is a diagram showing the relation between the luminance and inverted value of concentration.

FIG. 3 is a diagram showing the relation between the luminance and the inverted value of the concentration. In FIG. 3, the relation between an Rc value in image data obtained after the printing image process as the inverted value of the density and an R value in read image data of an image on a printed matter on which the above image data (the image subjected to the printing image process) as the luminance is printed is shown. In FIG. 3, the relation between Rc and R is shown for convenience, but the relation between Gm and G and the relation between By and B are set in the same relation.

Figure 4:
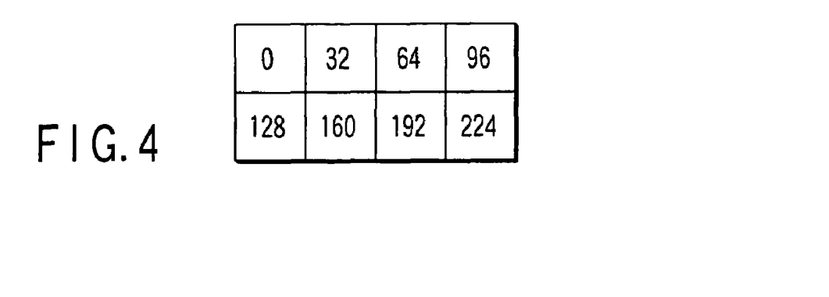
FIG. 4 is a diagram showing one example of an image having various concentration regions.

FIG. 4 is a diagram showing one example of an image having a plurality of regions of plural types of concentrations (luminance values).

In FIG. 4, the luminance values of the respective regions are expressed by numeric values. In FIG. 4, the luminance values become small (the concentrations become higher) as the numeric values become smaller. For example, the numeric value "0" indicates that the luminance value is the smallest (the concentration is the highest).

In this case, it is assumed that the printer 12 prints an image (CMY image data) obtained by subjecting the image (RGB image data) shown in FIG. 4 only to the printing image process on a recording medium. In this case, the same image as that shown in FIG. 4 is printed on the recording medium (printing matter). If the image on the recording medium on which the image of FIG. 4 is printed is read by the scanner 14, image data (read image data) of RGB is obtained.

The relation between the Rc value as the inverted value of an image (CMY image data) obtained by subjecting the image (RGB image data) of FIG. 4 only to the printing image process and the R value in the image data of RGB obtained by reading the image on the recording medium on which the image of FIG. 4 is printed by use of the scanner 14 is indicated by the characteristic shown by a curve "a" in FIG. 3. The curve "a" shows the logarithmic characteristic. In other words, the R value indicating the luminance shows the logarithmic characteristic with respect to the Rc value which is an inverted value of the concentration. Therefore, the luminance and the inverted value of the concentration are set in the logarithmic relation as shown by the curve "a" in FIG. 3.

Further, if R values (or G or B values) of image data shown in FIG. 4 obtained before the printing image process is performed are taken on the axis of abscissa, the relation between the luminance of image data before the printing image process is performed and the luminance of read image data of an image on the printed matter on which image data obtained by subjecting the above image data to the printing image process is printed becomes a linear relation as expressed by a straight line "b" shown by broken lines in FIG. 3.

In the digital watermark embedding technique using a color difference, basically, sub-information is embedded by attaching color differences to R, G, B which are luminance information. In other words, in the digital watermark embedding technique using the color difference, it is necessary to embed sub-information in luminance information which is set in the linear relation as expressed by the straight line "b" indicated by the broken lines in FIG. 3. If sub-information is embedded with respect to inverted values (Rc values, Gm values and By values) of concentration set in the logarithmic relation with luminance values (R values, G values and B values) by use of the same color difference amounts as the luminance information, it becomes impossible to attain desired color difference amounts in some cases when the printing operation is performed.

Therefore, in the preprocessing section 17, image data which is subjected to the printing image process is preprocessed so that sub-information can be embedded by use of the same color difference amount as the luminance information.

Figure 5:
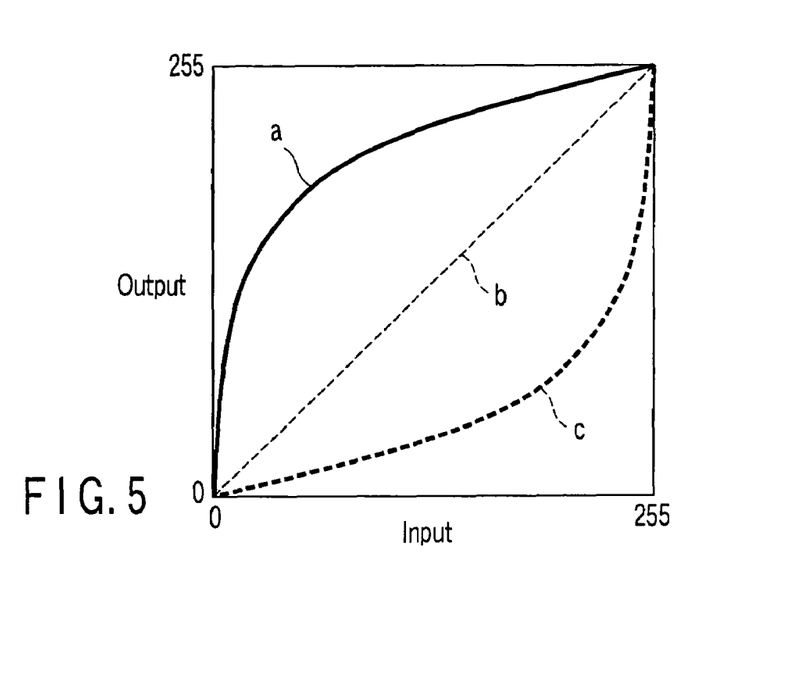
FIG. 5 is a diagram for illustrating inverse conversion with respect to the relation between the luminance and the inverted value of the concentration.

FIG. 5 is a diagram showing a curve "c" as inverse conversion of the curve "a" indicating the relation between the luminance and the inverted value of the concentration.

That is, the curve "c" indicated by a one-dot-dash line in FIG. 5 indicates the inverse conversion of the curve "a". Therefore, if inverse conversion of the curve "a" as indicated by the curve "c" of FIG. 5 is applied to the inverted value of concentration, the inverted value of concentration (image data of the characteristic indicated by the curve "a" of FIG. 5) can be converted into a value set in the linear relation with respect to the luminance as shown by the straight line "b".

Thus, in the preprocessing section 17, inverted values of concentration with respect to CMY image data subjected to the printing image process are calculated and the inverted values of concentration are subjected to the conversion process (gradation correction process) indicated by the curve "c" of FIG. 5. Thus, in the preprocessing section 17, the inverted values of concentration (Rc, Gm, By) can be converted into equivalent values of the luminance values (R, G, B). In other words, sub-information having the same color difference amount as the luminance can be embedded into image data subjected to the preprocess by the preprocessing section 17.

Further, the image data subjected to the preprocess by the preprocessing section 17 is different from image data to be actually printed. Therefore, it is necessary to restore the image data having sub-information embedded therein into image data indicating concentrations of C, M, Y again. The process is the post-process by the post-processing section 19. In the post-processing section 19, the process corresponding to the preprocess by the preprocessing section 17 is performed as the post-process for image data having sub-information embedded therein.

Further, in the post-process by the post-processing section 19, the conversion process for setting up the inverted relation with respect to the preprocess by the preprocessing section 17 is performed. For example, in the preprocessing section 17, the conversion process is performed as the preprocess as indicated by the curve "c" which is set in the inversely converted relation with respect to the curve "a" of FIG. 5. In this case, in the post-processing section 19, the conversion process is performed as the post-process as indicated by the curve "a" which is set in the inversely converted relation with respect to the curve "c" of FIG. 5. Therefore, in the post-processing section 19, the conversion process as indicated by the curve "a" is performed with respect to image data having sub-information embedded therein by the digital watermark embedding section 18 as the post-process to restore the inverted values of concentration to concentration values. As a result, in the post-process by the post-processing section 19, CMY image data indicating concentrations of C, M, Y can be attained.

Next, a process for embedding sub-information into a region of high concentration in a main image (to-be-embedded information carrying image) is explained as the concrete example of the above process.

First, a process for embedding sub-information into a region of high concentration in a general main image (to-be-embedded information carrying image) is explained. In this case, for example, if the main image is a face image of a person, the region of high concentration corresponds to an image region of a black hair region.

Figure 6A:
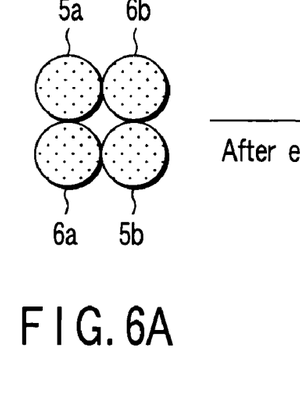
FIG. 6A is a diagram showing an example of the configuration of four pixels in one part of the high concentration region of a main image.
Figure 6B:
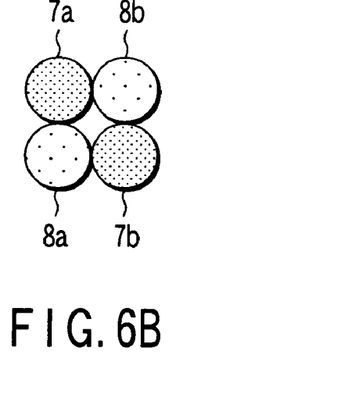
FIG. 6B is a diagram showing a state in which sub-information is embedded in the four pixels shown in FIG. 6A.

FIG. 6A is a diagram showing an example of four pixels as part of the main image. FIG. 6B is a diagram showing a state in which sub-information is embedded into an image configured by the four pixels shown in FIG. 6A.

FIG. 6A schematically shows four pixels (dots) 5a, 5b, 6a, 6b in the high-concentration region of the main image. For example, if the main image is a face image, the black hair portion may be the high-concentration region. In this case, it is assumed that all of the R values, G values and B values as luminance information are set at "36" in the four pixels shown in FIG. 6A.

FIG. 6B shows a state in which the four pixels shown in FIG. 6A are subjected to the digital watermark embedding process. In FIG. 6B, four pixels 7a, 7b, 8a, 8b obtained by embedding sub-information into the four pixels 5a, 5b, 6a, 6b shown in FIG. 6A are schematically shown. As shown in FIG. 6B, the digital watermark carrier pattern is a pattern having the pixels 7a and 7b and the pixels 8a and 8b as one set. The carrier pattern is not limited to the above pattern.

The pixels 7a and 8a (pixels 7b and 8b) have a desired color difference. For example, in the pixels 7a and 7b, the R value, G value and B value as luminance information are respectively set at "24", "48" and "48". Further, in the pixels 8a and 8b, the R value, G value and B value as luminance information are respectively set at "48", "24" and "24". As a result, the color difference of R, G, B between the pixels 7a and 8a or between the pixels 7b and 8b is set to "24". In the four pixels shown in FIG. 6B, the average values of the R values, G values and B values are each set to "(24+48)/2=36". The above color difference cannot be identified by the human eye.

Therefore, sub-information can be embedded in a state in which the sub-information cannot be visually recognized by the human eye.

Next, a process for embedding sub-information into a high-concentration region in the main image (to-be-embedded information carrying image) by the image printing mechanism according to the present embodiment is explained.

Figure 7A:
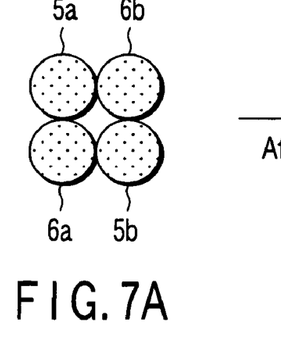
FIG. 7A is a diagram showing an example of the configuration of four pixels in one part of the high concentration region of a main image.
Figure 7B:
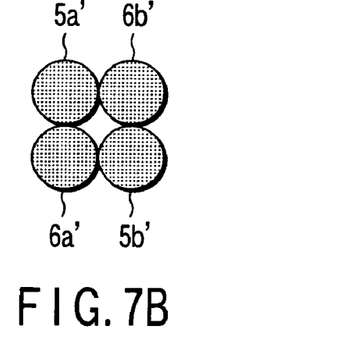
FIG. 7B is a diagram showing a state in which the four pixels shown in FIG. 7A are subjected to a preprocess.
Figure 7C:
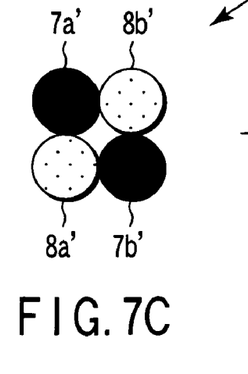
FIG. 7C is a diagram showing a state in which the four pixels shown in FIG. 7B are subjected to an digital watermark embedding process.
Figure 7D:
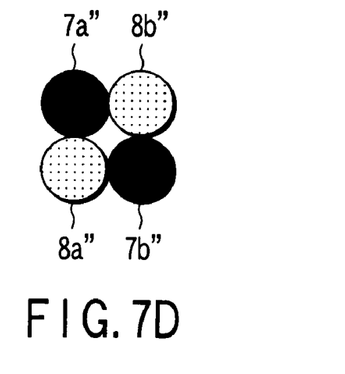
FIG. 7D is a diagram showing a state in which the four pixels shown in FIG. 7C are subjected to a post-process.

FIG. 7A is a diagram showing an example of four pixels used as part of the main image. FIG. 7B shows a state set up after the four pixels shown in FIG. 7A are subjected to a preprocess. FIG. 7C shows a state set up after the four pixels shown in FIG. 7B are subjected to an digital watermark embedding process. FIG. 7D shows a state set up after the four pixels shown in FIG. 7C are subjected to a post-process.

Like the case of FIG. 6A, in FIG. 7A, four pixels $5a$, $5b$, $6a$, $6b$ are schematically shown as four pixels in the high-concentration region of the main image. In this case, it is assumed that all of the R values, G values and B values as luminance information items are set at "36" in the four pixels shown in FIG. 7A.

Four pixels $5a'$, $5b'$, $6a'$, $6b'$ shown in FIG. 7B schematically show a state set up by subjecting the four pixels $5a$, $5b$, $6a$, $6b$ shown in FIG. 7A to the preprocess. In the preprocessing section 17, the gradation correction process is performed as the preprocess based on the characteristic shown by the curve "c" in FIG. 5. The gradation correction process shown by the curve "c" in FIG. 5 is performed to enhance the concentration. Therefore, the concentration of the four pixels shown in FIG. 7B becomes higher than that of the four pixels shown in FIG. 7A. For example, it is assumed that all of the R values, G values and B values as luminance information items in the pixels $5a'$, $5b'$, $6a'$, $6b'$ shown in FIG. 7B are set to "12".

Four pixels $7a'$, $7b'$, $8a'$, $8b'$ shown in FIG. 7C schematically show a state in which sub-information is embedded in the four pixels $5a'$, $5b'$, $6a'$, $6b'$ shown in FIG. 7B by the digital watermark embedding process. In the digital watermark embedding section 18, a color difference is given to adjacent pixels. For example, it is assumed that the digital watermark embedding section 18 embeds sub-information into the four pixels $5a'$, $5b'$, $6a'$, $6b'$ to set the color difference between the pixels $7a'$ and $8a'$ (and between the pixels $7b'$ and $8b'$) to "24" like the case of FIG. 6B. In this case, the R value, G value and B value of the pixels $7a'$ and $7b'$ as luminance information are set to "0", "24" and "24" and the R value, G value and B value of the pixels $8a'$ and $8b'$ as luminance information are set to "24", "0" and "0".

Four pixels $7a''$, $7b''$, $8a''$, $8b''$ shown in FIG. 7D schematically show a state in which the four pixels $7a'$, $7b'$, $8a'$, $8b'$ shown in FIG. 7C are subjected to the post-process. In the post-processing section 19, a process for setting up the inverted relation to that of the preprocess by the preprocessing section 17 is performed as the post-process. That is, in the preprocessing section 17, the gradation correction process is performed based on the characteristic shown by the curve "c" in FIG. 5. Therefore, in the post-processing section 19, the gradation correction process is performed based on the characteristic shown by the curve "a" in FIG. 5 which corresponds to inverse conversion of the curve "c" of FIG. 5. The gradation correction process as the post-process is performed to lower the concentration as shown by the curve "a" in FIG. 5. For example, in FIG. 7D, the R value as luminance information of the pixels $7a''$ and $7b''$ is kept at "0" and the R value as luminance information of the pixels $8a''$ and $8b''$ is set to "72". In this case, the color difference amount ("24") embedded as sub-information in the digital watermark embedding process increases to three times ("72") in the image data obtained after the post-process.

As described above, in the high concentration region of the main image, the color difference amount embedded as sub-information increases by the preprocess performed before the digital watermark embedding process and the post-process performed after the digital watermark embedding process. Therefore, the restorability of sub-information embedded in the high concentration region of the main image by use of the color difference is enhanced. At this time, the carrier pattern is difficult to be recognized in the high concentration region of the main image, and therefore, the image quality is not degraded. As a result, the restorability of sub-information can be enhanced while the carrier pattern is kept difficult to be recognized by the human eye in the high concentration region of the main image.

Next, a concrete example of the process for embedding sub-information into an intermediate concentration region in the main image (to-be-embedded information carrying image) is explained.

First, a process for embedding sub-information into a region of intermediate concentration in a general main image (to-be-embedded information carrying image) is explained. In this case, for example, if the main image is a face image of a person, it is assumed that the region of intermediate concentration corresponds to an image region of a skin portion of a person.

Figure 8A:
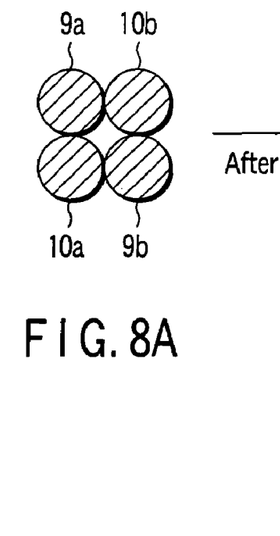
FIG. 8A is a diagram showing an example of the configuration of four pixels in one part of the intermediate concentration region of a main image.
Figure 8B:
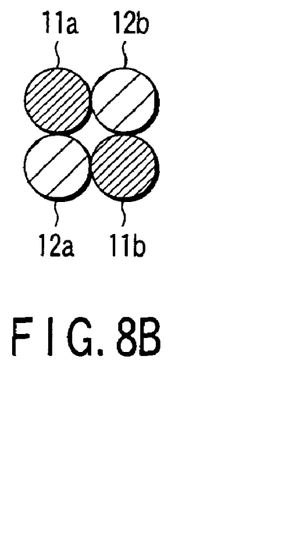
FIG. 8B is a diagram showing a state in which sub-information is embedded in the four pixels shown in FIG. 8A.

FIG. 8A is a diagram showing an example of four pixels as part of the main image. FIG. 8B is a diagram showing a state in which sub-information is embedded in the four pixels shown in FIG. 8A.

FIG. 8A schematically shows four pixels (dots) $9a$, $9b$, $10a$, $10b$ in the intermediate concentration region of the main image. For example, if the main image is a face image, a region of the skin portion of a person becomes the intermediate concentration region. In this case, it is assumed that all of the R values, G values and B values as luminance information items are set at "128" in the four pixels shown in FIG. 8A.

FIG. 8B shows a state in which the four pixels shown in FIG. 8A are subjected to the digital watermark embedding process. In FIG. 8B, four pixels $11a$, $11b$, $12a$, $12b$ obtained by embedding sub-information into the four pixels $9a$, $9b$, $10a$, $10b$ shown in FIG. 8A are schematically shown. As shown in FIG. 8B, the digital watermark carrier pattern is a pattern having the pixels $11a$ and $12a$ (and the pixels $11b$ and $12b$) as one set. The carrier pattern is not limited to the above pattern.

The pixels $11a$ and $12a$ (pixels $11b$ and $12b$) have a desired color difference. For example, in the pixels $11a$ and $11b$, the R value, G value and B value as luminance information are set at "116", "140" and "140". Further, in the pixels $12a$ and $12b$, the R value, G value and B value as luminance information are set at "140", "116" and "116". As a result, the color difference of the R value, G value and B value between the pixels $11a$ and $12a$ or between the pixels $11b$ and $12b$ is set to "24". In the four pixels shown in FIG. 8B, the average values of the R values, G values and B values are each set to "(116+140)/2=128". The above color difference cannot be identified by the human eye. Therefore, sub-information can be embedded in a state in which the sub-information cannot be visually recognized by the human eye.

Next, the preprocess, digital watermark embedding process and post-process performed for the intermediate concentration region in the main image (to-be-embedded information carrying image) by the image printing mechanism according to the present embodiment are explained.

Figure 9A:
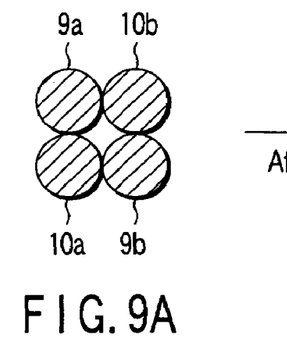
FIG. 9A is a diagram showing an example of the configuration of four pixels in one part of the intermediate concentration region of a main image.
Figure 9B:
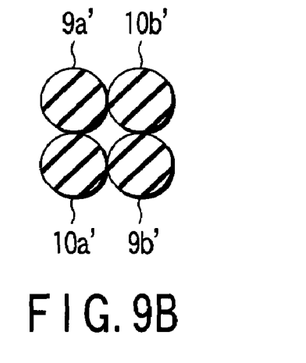
FIG. 9B is a diagram showing a state in which the four pixels shown in FIG. 9A is subjected to a preprocess.
Figure 9C:
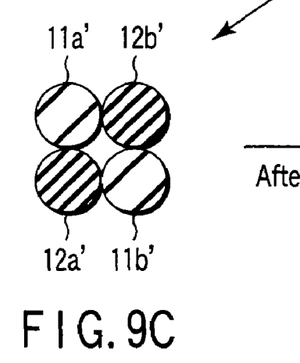
FIG. 9C is a diagram showing a state in which the four pixels shown in FIG. 9B is subjected to an digital watermark embedding process.
Figure 9D:
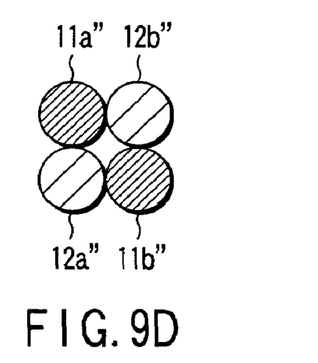
FIG. 9D is a diagram showing a state in which the four pixels shown in FIG. 9C is subjected to a post-process.

FIG. 9A is a diagram showing an example of four pixels as part of the main image. FIG. 9B shows a state set up after the four pixels shown in FIG. 9A are subjected to the preprocess. FIG. 9C shows a state set up after the four pixels shown in FIG. 9B are subjected to the digital watermark embedding process. FIG. 9D shows a state set up after the four pixels shown in FIG. 9C are subjected to the post-process.

Like the case of FIG. 8A, in FIG. 9A, pixels 9a, 9b, 10a, 10b are schematically shown as the four pixels in the intermediate concentration region of the main image. In this case, it is assumed that all of the R values, G values and B values as luminance information are set at "128" in the four pixels shown in FIG. 9A.

Four pixels 9a', 9b', 10a', 10b' shown in FIG. 9B schematically show a state set up by subjecting the four pixels 9a, 9b, 10a, 10b shown in FIG. 9A to the preprocess. In the preprocessing section 17, the gradation correction process is performed as the preprocess based on the characteristic shown by the curve "c" in FIG. 5. The gradation correction process shown by the curve "c" in FIG. 5 is performed to enhance the concentration. Therefore, the concentration of the four pixels shown in FIG. 9B becomes higher than that of the four pixels shown in FIG. 9A. For example, it is assumed that all of the R values, G values and B values as luminance information items in the pixels 9a', 9b', 10a', 10b' shown in FIG. 9B are corrected to "92".

Four pixels 11a', 11b', 12a', 12b' shown in FIG. 9C schematically show a state in which sub-information is embedded in the four pixels 9a', 9b', 10a', 10b' shown in FIG. 9B by the digital watermark embedding process. In the digital watermark embedding section 18, a color difference is given to adjacent pixels. For example, it is assumed that the digital watermark embedding section 18 embeds sub-information into the four pixels 9a', 9b', 10a', 10b' to set the color difference between the pixels 11a' and 12a' (and between the pixels 11b' and 12b') to "24" like the case of FIG. 8B. In this case, the R value, G value and B value of the pixels 11a' and 11b' as luminance information items are set to "80", "104" and "104" and the R value, G value and B value of the pixels 12a' and 12b' as luminance information items are set to "104", "80" and "80".

Four pixels 11a", 11b", 12a", 12b" shown in FIG. 9D schematically show a state in which the four pixels 11a', 11b', 12', 12b' shown in FIG. 9C are subjected to the post-process. In the post-processing section 19, a process for setting up the inverted relation with respect to the preprocess by the preprocessing section 17 is performed as the post-process. That is, in the preprocessing section 17, the gradation correction process is performed based on the characteristic shown by the curve "c" in FIG. 5. Therefore, in the post-processing section 19, the gradation correction process is performed based on the characteristic shown by the curve "a" in FIG. 5 which corresponds to inverse conversion of the curve "c" of FIG. 5. The gradation correction process as the post-process is performed to lower the concentration as shown by the curve "a" in FIG. 5. For example, in FIG. 9D, the R value as luminance information of the pixels 11a" and 11b" is set to "116" and the R value as luminance information of the pixels 12a" and 12b" is set to "140".

As described above, in the intermediate concentration region of the main image, the color difference amount embedded as sub-information is kept unchanged even by the preprocess performed before the digital watermark embedding process and the post-process performed after the digital watermark embedding process. Therefore, high restorability of the sub-information embedded in the intermediate concentration region of the main image by use of the color difference can be attained. Further, in the intermediate concentration region, the color difference is easily recognized by the human eye if it is made larger, but an image in the intermediate concentration region has a property that the image quality thereof is difficult to be degraded in the printing process by the printer and in the read process by the scanner. Therefore, according to the above process, the high restorability of sub-information can be attained while the carrier pattern is kept difficult to be recognized by the human eye in the intermediate concentration region of the main image.

In the above embodiment, the gradation correction process is performed based on the characteristic as shown by the curve "c" of FIG. 5 as the preprocess for the multi-gradation image input via the image input device, sub-information is embedded in the multi-gradation image subjected to the gradation correction process of the curve "c" in an invisible state, and the gradation correction process which is set in the inverted relation with respect to the preprocess, that is, the gradation correction process based on the characteristic as shown by the characteristic "a" of FIG. 5 which is set in the inverted conversion relation with respect to the characteristic "c" shown in FIG. 5 is performed as the post-process for the multi-gradation image having sub-information embedded therein.

Thus, according to the present embodiment, an image processing method which can stably embed sub-information with high restorability into any type of multi-gradation image without lowering the image quality can be provided. Further, in the image printing method and image printing mechanism to which the above image processing method is applied, printed matter in which the restorability of sub-information is high and to which an digital watermark making it difficult to forge and falsify the printed matter is applied can be formed.

Further, according to the above preprocess and post-process, the color difference amount is increased and sub-information with high restorability can be embedded in the high concentration region of the main image which is difficult to be recognized even if the color difference amount of the carrier pattern is large. Further, in the intermediate concentration region of the main image which is easily visually recognized if the color difference amount of the carrier pattern becomes larger, sub-information can be stably embedded without increasing the color difference amount.

Next, printed matter P2 printed by the above image printing mechanism is explained.

Figure 10:
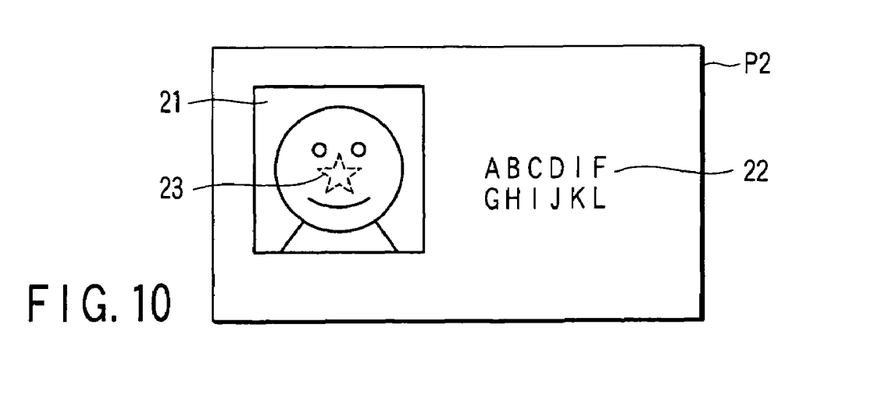
FIG. 10 is a view showing one example of a printed matter.

FIG. 10 is a view showing one example of the printed matter P2 printed (formed) by the above image printing mechanism. In the example of FIG. 10, an ID card as the printed matter P2 having a face image 21 and character image 22 printed thereon is shown. In the ID card used to identify an individual, it is necessary to take countermeasures so as to prevent forgery and falsification. Therefore, in the ID card shown in FIG. 10, sub-information (a star mark indicated by broken lines) 23 is embedded in the face image 21.

That is, on the ID card as the printed matter P2 shown in FIG. 10, a synthesized image having sub-information embedded in the face image as the main image is printed by the image printing mechanism. In the image printing mechanism, the color difference amount of the carrier pattern is increased in the higher concentration region of the face image as the main image by the preprocess, digital watermark embedding process and post-process and then a synthesized image having sub-information embedded therein is printed.

Therefore, in the ID card as the printed matter P2, restorability of sub-information can be easily attained even in the high concentration region of the face image 21. In other words, in the ID card as the printed matter P2, the face image 21 in which the sub-information 23 to be more easily restored if it has higher concentration is embedded can be printed.

The image quality of the high concentration region in the image printed on the printed matter P2 tends to be degraded in the image reading process by the scanner. Further, the image quality of the high concentration region in the image printed on the printed matter P2 tends to be degraded in the printing process by the printer.

That is, in the printed matter P2 on which the face image 21 in which the sub-information 23 to be more easily restored if it has higher concentration is embedded is printed, the restorability of the sub-information 23 is high even if the image quality of the high concentration region is degraded in the image reading process by the scanner or in the image forming process by the printer. As a result, printed matter in which the restorability of the sub-information is high and the truth or falsehood can be easily determined to prevent forgery and falsification thereof can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing method for a multi-gradation image comprising:
   inputting a multi-gradation image,
   subjecting an input multi-gradation image to a pre-process based on a relation between certain image data and read image data of a printed matter on which the certain image data is printed,
   embedding sub-information into the multi-gradation image subjected to the pre-process in an invisible state,
   subjecting the multi-gradation image having the sub-information embedded therein to a post-process corresponding to the pre-process;
   wherein the pre-process is a gradation correction process based on a relationship between printing image data and read image data of a printed matter on which the printing image data is printed; and
   wherein the post-process is a gradation correction process of inverse conversion with respect to the gradation correction process performed as the pre-process.

2. The image processing method according to claim 1, wherein the post-process is a process which is set in an inverted conversion relationship with respect to the pre-process.

3. An image printing method for printing a multi-gradation image on a recording medium, comprising:
   inputting a multi-gradation image,
   subjecting an input multi-gradation image to a printing image process,
   subjecting the multi-gradation image subjected to the printing image process to a pre-process based on a relationship between certain image data and read image data of a printed matter on which the certain image data is printed,
   embedding sub-information into the multi-gradation image subjected to the pre-process in an invisible state,
   subjecting the multi-gradation image having the sub-information embedded therein to a post-process corresponding to the pre-process,
   printing the multi-gradation image subjected to the post-process on a recording medium;
   wherein the pre-process is a gradation correction process based on a relationship between printing image data and read image data of a printed matter on which the printing image data is printed; and
   wherein the post-process is a gradation correction process of inverse conversion with respect to the gradation correction process performed as the pre-process.

4. The image printing method according to claim 3, wherein the post-process is a process which is set in an inverted conversion relationship with respect to the pre-process.

5. An image printing mechanism comprising:
   an image input section which inputs a multi-gradation image on a printed matter,
   a printing image processing section which subjects the multi-gradation image input by the image input section to a printing image process,
   a pre-processing section which subjects the multi-gradation image subjected to the printing image process by the printing image processing section to a pre-process based on a relationship between certain image data and read image data of a printed matter on which the certain image data is printed,
   a sub-information embedding section which embeds sub-information into the multi-gradation image subjected to the pre-process by the preprocessing pre-processing section in an invisible state,
   a post-processing section which subjects the multi-gradation image having the sub-information embedded therein by the sub-information embedding section to a post-process corresponding to the pre-process performed by the pre-processing section,
   a printing section which prints the multi-gradation image subjected to the post-process by the post-processing section on a recording medium;
   wherein the pre-processing section performs a gradation correction process based on a relationship between printing image data and read image data of a printed matter on which the printing image data is printed as the pre-process; and
   wherein the post-processing section performs a gradation correction process of inverse conversion with respect to the gradation correction process performed as the pre-process by the pre-processing section as the post-process.

6. The image printing mechanism according to claim 5, wherein the post-processing section performs a post-process having an inverted conversion relationship with respect to the pre-process performed by the pre-processing section.

* * * * *